Dec. 22, 1942.  A. J. TROYER  2,305,913
SPRAYING APPARATUS
Filed May 20, 1940  2 Sheets-Sheet 2
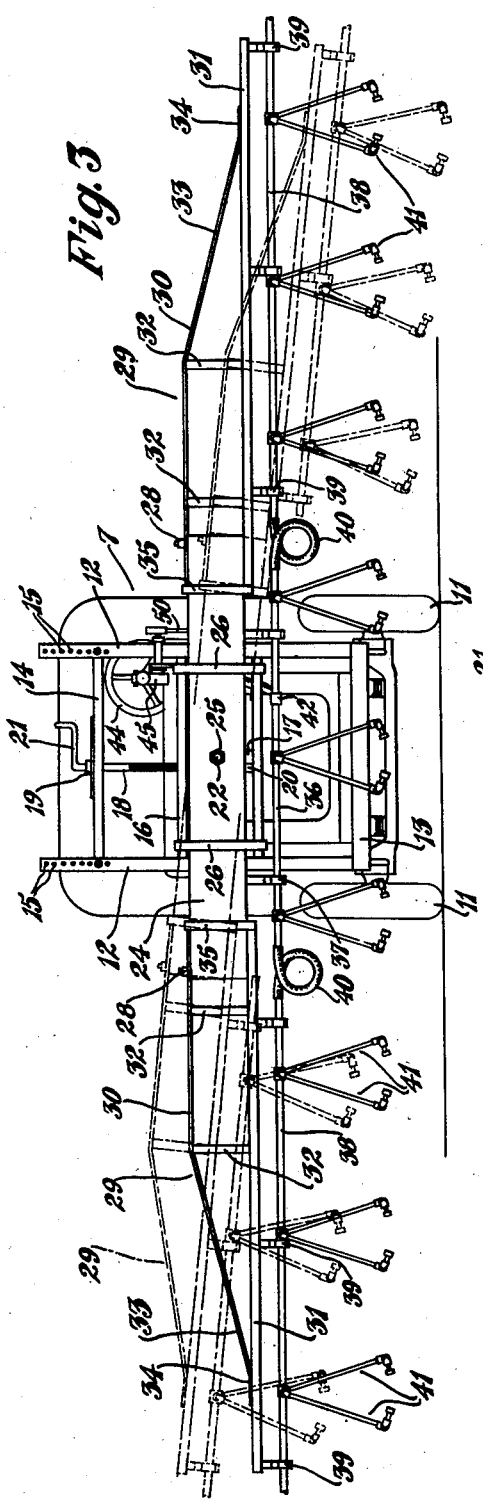
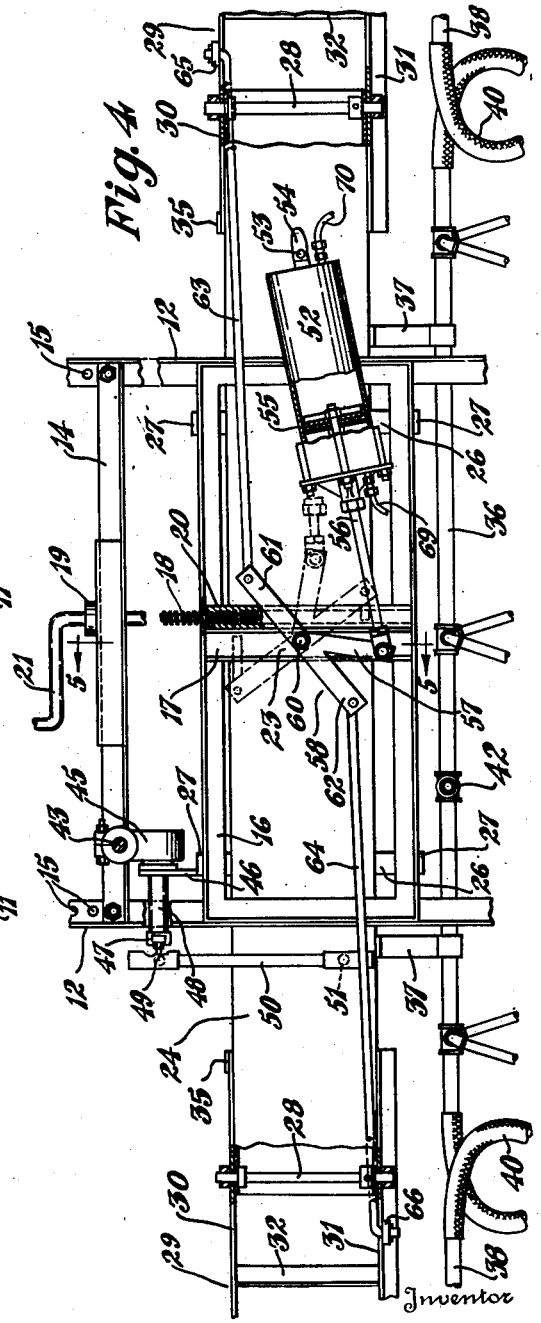
Inventor
Abner J. Troyer
By Frease and Bishop
Attorneys Patented Dec. 22, 1942

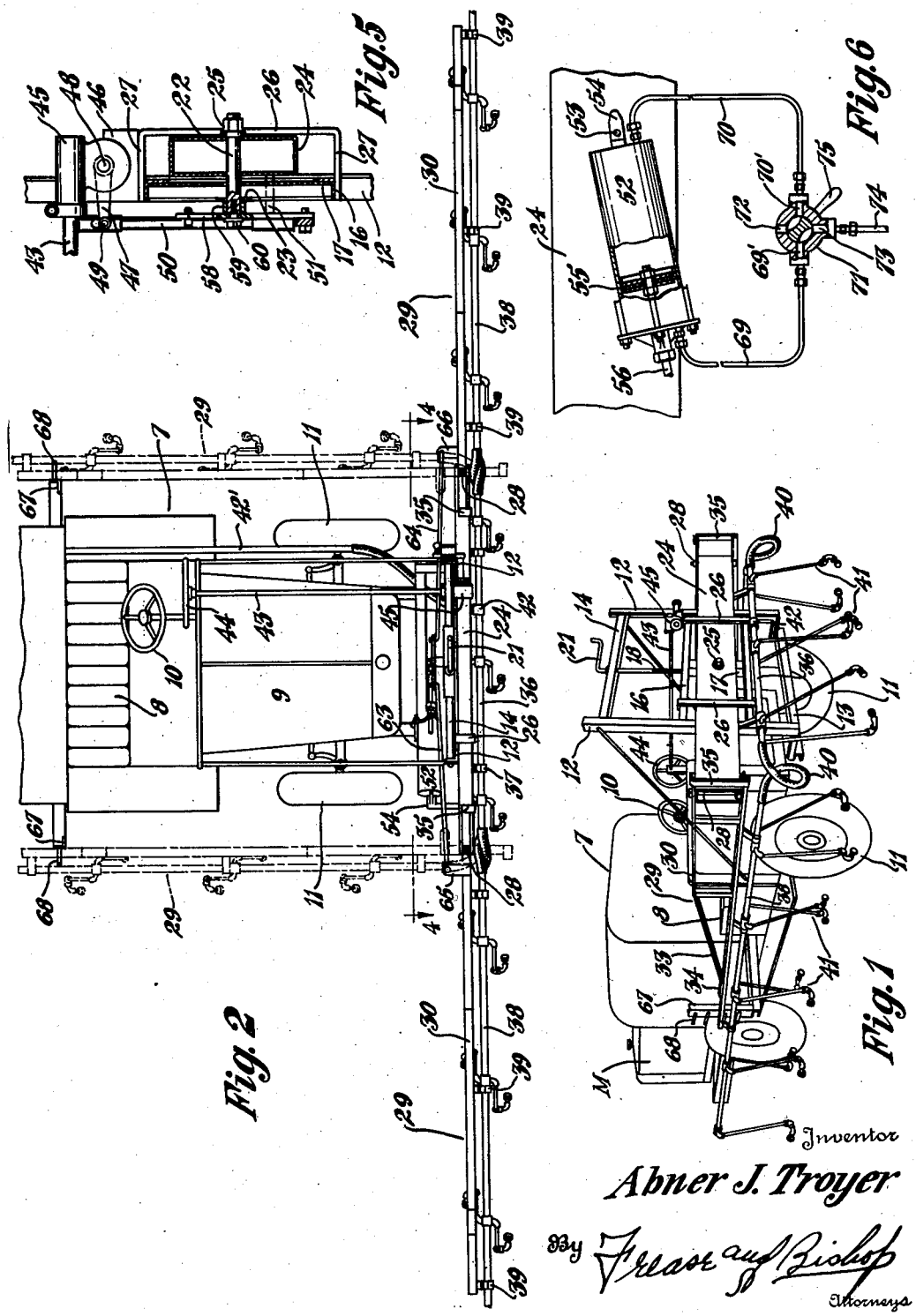

2,305,913

UNITED STATES PATENT OFFICE 2,305,913

SPRAYING APPARATUS

Abner J. Troyer, Smithville, Ohio

Application May 20, 1940, Serial No. 336,171

2 Claims. (Cl. 299—39)

The invention relates generally to apparatus for spraying vegetation, and more particularly to apparatus for spraying a plurality of spaced apart rows of crops.

In general terms, the invention includes a sprayer beam carrying a series of spray nozzles extending transversely of the supporting vehicle and pivoted thereon at its central portion for being swung vertically, said swinging movement being controlled from the driver's seat of the vehicle, and the end portions of the sprayer beam being foldable alongside the vehicle by vacuum cylinder means which yieldingly maintains the beam end portions in extended position.

Referring to the drawings forming part hereof,

Figure 1 is a perspective view of a spraying apparatus embodying the present improvements, showing the end portions of the sprayer beam in folded position alongside the vehicle;

Fig. 2 is a fragmentary plan view somewhat enlarged, showing the sprayer beam in extended position transversely of the vehicle;

Fig. 3 is a front elevation thereof, showing the beam swung vertically to an adjusted position, in dot-dash lines;

Fig. 4 is an enlarged fragmentary elevation taken at the rear side of the sprayer beam, as on line 4—4, Fig. 2;

Fig. 5 is a fragmentary vertical sectional view as on line 5—5, Fig. 4; and

Fig. 6 is a more or less diagrammatic view showing the vacuum cylinder for controlling the folding wings of the sprayer beam, and the operating connections therefor.

Similar numerals refer to similar parts throughout the drawings.

In the drawings, the improved spraying apparatus is shown mounted on the front end of a conventional automotive vehicle indicated generally at 7, having a driver's seat 8 located behind the engine hood 9, and a usual steering wheel 10 for controlling the front wheels 11 of the vehicle. An additional motor indicated at M may be mounted on the rear end of the vehicle for driving a fluid pump for supplying spraying fluid under pressure.

Preferably, an upright frame is supported on the front end of vehicle 7, and includes laterally spaced upright angle posts 12 supported at their lower ends on a transverse channel 13 which may be secured to the frame of vehicle 7 in any suitable manner. A transverse angle 14 connects the upright angles 12 near their upper ends, and as best shown in Fig. 3, a series of bolt holes 15 are preferably provided in the upper end portions of angles 12 for connecting the transverse angle 14 thereto at different heights.

A rectangular angle frame 16 extends between and is slidable within the outer legs of the frame angles 12 intermediate the top and bottom thereof, and a vertical channel 17 extends across and is secured to the top and bottom portions of said rectangular frame 16 midway laterally between the upright angles 12. The improved transverse sprayer beam is pivotally mounted at the center of said channel 17 and at the center of said rectangular frame 16. Means for raising and lowering the frame 16 to adjust the height of the sprayer beam above the ground preferably includes a vertical screw 18 journaled in a suitable thrust bearing 19 supported on transverse angle 14, and the screw 18 is threadedly engaged in an internally threaded sleeve member 20 secured in and extending across the top and bottom portions of the rectangular frame 16. A crank handle 21 may be provided at the upper end of screw 18 for rotating the same to raise and lower the rectangular frame and with it the sprayer beam.

The pivotal mounting for the sprayer beam preferably includes a shaft 22 extending horizontally through the web of channel 17 and through a plate 23, secured across the legs of channel 17 midway of its ends, as by welding. The shaft 22 projects forwardly from the channel 17, and the central beam member 24 of the transverse beam is pivotally mounted on said projecting shaft end. The central beam member 24 is preferably constructed of sheet metal in box-like form to provide a hollow beam member of rectangular cross section, and the projecting end of pivot shaft 22 is provided with nut and washer means 25 for holding the beam member 24 in place on the pivot shaft 22.

U-shaped straps 26 are secured at their ends to the top and bottom portions of rectangular frame 16 and engirdle the box-like beam member 24 for permitting limited vertical swinging movement thereof on the shaft 22, the top and bottom legs 27 of the straps 26 serving as stops for engaging the beam member 24 to limit its vertical swinging movement.

The central beam member 24 projects laterally a substantial distance beyond the upright frame members 12 at each side thereof, and vertical hinge pins 28 are provided in the outer ends of said beam member 24 on which pins are journaled, the overlapping inner ends of the outer beam portions or folding wings indicated generally at 29.

Each beam end portion or wing 29 preferably includes a top bar 30 and a bottom angle 31, with vertical struts 32 extending between and secured thereto. Beyond the outer strut 32 the top bar is preferably bent downwardly as shown at 33 and secured at 34 to the outer end of the bottom angle 31, as by welding.

The inner end portions of the top bars 30 and the bottom angles 31 overlap the outer ends of the central beam member 24, and vertical strap bars 35 connect the extreme inner ends of said bars 30 and angles 31 on the front side of beam member 24, so that when the wings 29 are in extended position as shown in Figs. 2, 3 and 4, the strap bars 35 prevent the wings 29 from swinging forwardly beyond a position of alignment with beam member 24.

The sprayer beam supports a header pipe in three sections, one depending from the central beam member 24 and one depending from each beam wing 29. The central pipe section 36 is carried by brackets 37 secured to and depending from the beam member 24 at opposite sides of the upright frame members 12, and the pipe wing sections 38 are carried in depending brackets 39 secured at intervals to the bottom angles 31 of the wings 30.

The pipe sections 36 and 38 are connected together by flexible conduit means such as the hose connections 40, so as to permit the pipe wing sections 38 to fold with the beam wing sections 29. The pipe sections 36 and 38 are provided at spaced intervals with pairs of depending sprayer nozzles indicated generally at 41 of usual construction, for discharging quantities of sprayer fluid in the form of mist onto the rows of crops or vegetation as the vehicle is moved between the rows. The central pipe section 36 may be connected, as shown at 42 in Fig. 4, with a source of supply of spraying fluid under pressure which is pumped through a conduit 42' (Fig. 2) from the rear end of the vehicle.

The means for vertically swinging the sprayer beam as a whole about the pivot 22 preferably includes an operating rod 43 extending longitudinally of the vehicle and having a hand wheel 44 on its rear end near the driver's seat. The front end of the operating rod 43 is operatively connected to a worm and gear member 45 which is supported on a bracket plate 46 welded at its bottom end on the leg 27 of one of the straps 26. An arm 47 is secured at its inner end on the shaft 48 of the worm gear, and the arm 47 is pivotally connected at its outer end at 49 to the upper end of a depending link 50. The lower end of the depending link 50 is pivotally connected to a stud 51 which is secured as by welding to the rear side of the box-like central beam member 24.

Thus by turning the hand wheel 44 the operator of the vehicle rotates the arm 47 to move the link 50 up or down and vertically swing the box-like beam member 24 about the pivot shaft 22 to vertically swing the whole sprayer beam as a unit, as indicated in the dot-dash line position of Fig. 3.

The means for folding the wings 29 of the sprayer beam alongside the vehicle to the dot-dash positions indicated in Fig. 2, and for yieldingly maintaining the wings 29 in their extended positions in alignment with the central beam member 24 preferably includes a vacuum cylinder 52 connected with the intake of the vehicle motor and pivotally mounted on the rear side of the central beam member 24. As shown, the vacuum cylinder is pivoted at one end at 53 to a yoke 54 which is secured to the central beam member 24. A piston 55 of usual construction is reciprocable in the cylinder, and a piston rod 56 extends from the piston through the other end of the cylinder and is connected at its outer end to one arm 57 of a Y-shaped bell crank lever 58. The lever 58 is pivotally mounted on the rear end of the pivot shaft 22 and a bushing 59 surrounds the shaft between the lever 58 and the plate 23 through which the shaft extends. A screw 60 journals the lever 58 and holds it on the end of the pivot shaft 22.

The other arms 61 and 62 of the bell crank lever 58 extend outwardly from the central pivot in opposite directions and are pivotally connected at their outer ends to wing operating links 63 and 64 respectively. The outer end of the link 63 is pivoted to an ear 65 secured to the top bar 30 of one wing 29, and the outer end of link 64 is pivoted at its outer end to an ear 66 connected to the bottom angle 31 of the other wing 29.

Referring to Fig. 4, the piston 55 is shown in position to hold the bell crank lever 58 and links 63 and 64 in the position which maintains the wings 29 in extended position. When the position of the piston 55 is reversed, the bell crank 58 will assume the dot-dash position of Fig. 4 causing the links 63 and 64 to fold the wings alongside the vehicle to their dot-dash positions shown in Fig. 2. It will be noted from the dot-dash position of the lever 58 in Fig. 4 that the pivotal connection between the piston rod 56 and the bell crank arm 57 does not swing over center with respect to the pivot 60, even when the wings are in their folded position.

As shown in Figs. 1 and 2 angle posts 67 are provided at the sides of the vehicle having vertically spaced pins 68 projecting outwardly therefrom, on which the outer ends of the bottom angles 31 of the beam wings may be supported in folded position.

Referring to Fig. 6, the vacuum cylinder preferably has its opposite ends connected by conduits 69 and 70 to a four-way valve 71 which is preferably located within easy reach of the operator of the vehicle. The conduits 69 and 70 are connected to valve ports 69' and 70', and the valve is also provided with an exhaust port 72 communicating with the atmosphere and with an intake port 73 connected by a conduit 74 with the intake manifold of the gasoline motor of the vehicle. A valve handle 75 is provided for rotating the core of the valve to operate the piston 55 in the vacuum cylinder.

In the position shown in Fig. 6 the intake pipe 74 communicates with the conduit 69 to relieve the air pressure on the left side of the piston, and at the same time conduit 70 communicates through port 72 with the atmosphere to supply atmospheric pressure on the right side of the piston and maintain the piston in the position shown in Fig. 4 to hold the wings 29 in the extended position. While the wings are held in this position if one or both of them should strike an obstruction as the vehicle moves along tending to fold the wings, the shock of the impact would be cushioned by the air pressure yieldingly resisting movement of the piston 55, and the air pressure would return the wings to extended position when the obstruction was past, so that little or no damage would result to the spraying apparatus.

When it is desired to fold the wings the valve handle 75 is moved 90° to its opposite position when the intake 74 communicates with the conduit 70 and the atmosphere port 72 communicates with the conduit 69 to reverse the position of the piston, moving the bell crank to its dot-dash position of Fig. 4, and actuating the links 63 and 64 to fold the wings.

Thus the vacuum cylinder 52 serves the purpose of providing single means for selectively moving the wings to folded position and for yieldingly maintaining the wings in extended position.

The present spraying apparatus is compact and comparatively light in weight, and is adapted to be mounted on any conventional automotive vehicle.

In operating the improved spraying apparatus, when the operator approaches an inclined or sloping terrain, he can quickly swing the whole sprayer beam as a unit to adjust it to the incline by merely turning the hand wheel 44 a slight amount.

I claim:

1. Spraying apparatus including an upright frame mounted on one end of a vehicle having a driver's seat, a central transverse sprayer beam member mounted on said upright frame, wing beam members hinged on the outer ends of said central beam member for folding laterally alongside the vehicle when said wing beam members strike an object, sprayer nozzles depending from said central and wing beam members at intervals longitudinally thereof, and vacuum means operatively connected to said wing beam members and controllable from said driver's seat for selectively folding the wing beam members in the same direction as when they strike an object and for maintaining them in extended position in alignment with said central transverse beam member.

2. Spraying apparatus including a support, a central transverse sprayer beam member mounted on said support, wing beam members hinged on the outer ends of said central beam member for folding laterally at substantially rightangles thereto when said wing beam members strike an object, sprayer nozzles depending from said central and wing beam members at intervals longitudinally thereof, and vacuum means operatively connected to said wing beam members for selectively folding them in the same direction as when they strike an object and for yieldingly maintaining them in extended position in alignment with said central transverse beam member.

ABNER J. TROYER.